United States Patent [19]

Wingfield

[11] Patent Number: 4,539,078
[45] Date of Patent: Sep. 3, 1985

[54] METHOD OF AND APPARATUS FOR MAKING A SYNTHETIC BREAKWATER

[75] Inventor: William R. Wingfield, Richmond, Va.

[73] Assignee: Synthetic Breakwater, Richmond, Va.

[21] Appl. No.: 663,639

[22] Filed: Oct. 22, 1984

[51] Int. Cl.³ .......................... C25B 1/00; C25D 9/08
[52] U.S. Cl. ..................................... 204/1 R; 204/23; 204/56 R; 204/284
[58] Field of Search ................ 204/1 R, 23, 56 R, 24, 204/25, 26, 130, 132, 283, 284

[56] References Cited

U.S. PATENT DOCUMENTS

| | | | |
|---|---|---|---|
| 2,687,993 | 8/1954 | Cox | 204/34 |
| 4,246,075 | 1/1981 | Hilbertz | 204/1 R |
| 4,461,684 | 7/1984 | Hilbertz | 204/132 |

Primary Examiner—Thomas Tufariello
Attorney, Agent, or Firm—Griffin, Branigan, & Butler

[57] ABSTRACT

A method of, and apparatus for, making a synthetic breakwater involves the steps of arranging flat, approximately parallel electrodes (20 and 22) which are approximately coextensive with one another, so that they are spaced from one another by electrically insulative materials (10) with a gap of from 3 cm to 27 cm. An electrical potential is applied across these electrodes to cause a current density flowing between the electrodes of not greater than 0.1 milliamps (ma) per $cm^2$. In the preferred embodiment, the electrodes are spaced approximately 5 cm apart and a voltage of around 3 volts is applied thereacross. The flat cathode is of expanded electrically-conductive metal, with the anode being constructed of two materials, one of them being an outer casing (30) of lead.

15 Claims, 8 Drawing Figures

METHOD OF AND APPARATUS FOR MAKING A SYNTHETIC BREAKWATER

BACKGROUND OF THE INVENTION

This invention relates broadly to the subject matter of constructing breakwaters to protect beaches and the like from being eroded by the sea, and more particularly, to a method of forming such breakwaters by an electrochemical process.

The literature abounds in attempts by people to control erosion of seashores by constructing breakwaters and the like. However, the costs of creating such breakwaters have been enormous but yet the breakwaters themselves have met with only limited success. In most cases, the cost-to-benefit ratio has not been favorable. Thus, it is an object of this invention to provide a method of making sea breakwaters which is relatively inexpensive to practice but which will provide an effective, and permanent breakwater which has a favorable cost-to-benefit ratio. Similarly, it is an object of this invention to utilize minerals in the sea itself to create such an artificial breakwater.

Electrochemistry has had several applications in conjunction with sea water as an electrolyte. U.S. Pat. No. to Cox (2,200,469) discloses a method of cathodic cleaning and protection of metallic surfaces submerged in ocean water utilizing direct electrical current. More recently, Hilbertz U.S. Pat. No. (4,246,075) discloses the feasibility of applying electrochemical processes to the formation of large surface structures in an ocean environment. Although Hilbertz's patent discloses important general information pointing toward the feasibility of making such large surface structures, it does not set forth a practical method which can be used for making a breakwater. Thus, it is an object of this invention to provide a practical method which can be used in the construction of sea breakwaters utilizing an electrochemical process.

It has been previously known that minerals can be recovered from sea water by precipitating such minerals from the sea water. An electrical current is caused between an anode and cathode placed in the sea water to accomplish this.

SUMMARY

According to principles of this invention, a method of making a breakwater comprises the steps of arranging two relatively flat, approximately parallel, electrode plates in the sea water having an approximate shape of a wall of a breakwater to be formed. The electrodes are held in position by an electrically-insulative insulative supporting frame having two opposite parallel surfaces to which the respective electrodes are attached. The electrodes are separated by a gap of between 3 cm and 27 cm, and in a preferred embodiment, it is separated by around 5 cm. An electrical potential is applied evenly by a wire network across the electrodes to cause a current density flowing between said ectrodes not greater than 0.1 ma/cm$^2$, and preferably around 0.0175 ma/cm$^2$. In a preferred embodiment, an anode electrode is constructed of a conductor which is sheathed in a lead coating.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Describing now the method and apparatus of this invention, it is often desirable to place a breakwater near the interface between ocean and land in order to: (1) adjust the level of wave energy striking the coast; and (2) directly interfere with coastal sediment transfer processes. A breakwater which is placed as shown in FIG. 5 can intercept waves approaching a beach and, reduce wave-induced shore sediment transport.

Figure 1:
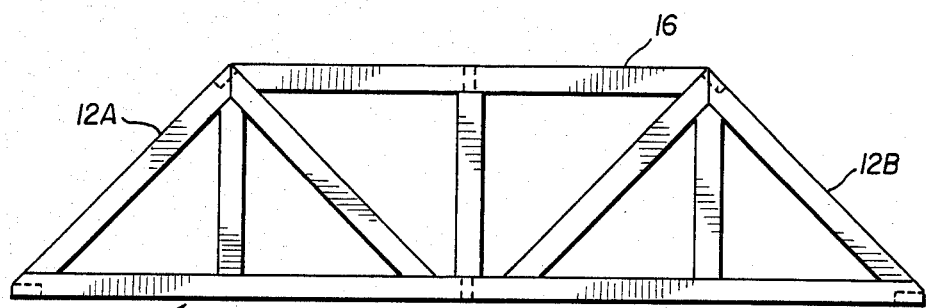
FIG. 1 is an end view of a frame used in the practice of the method of this invention.
Figure 2:
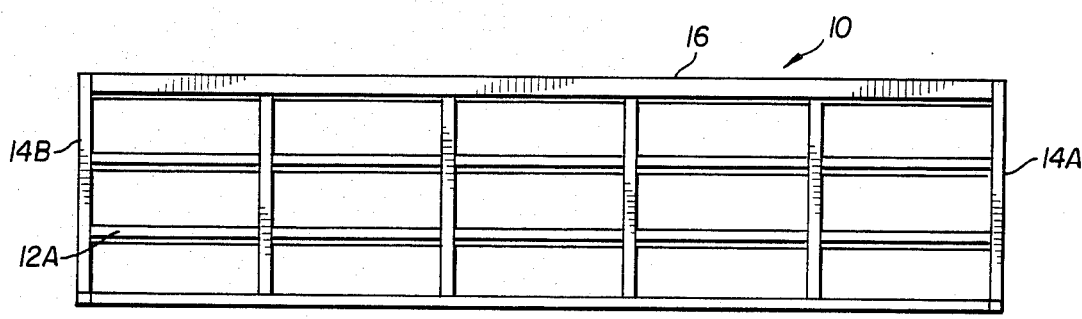
FIG. 2 is a side view of the frame of FIG. 1.
Figure 4:
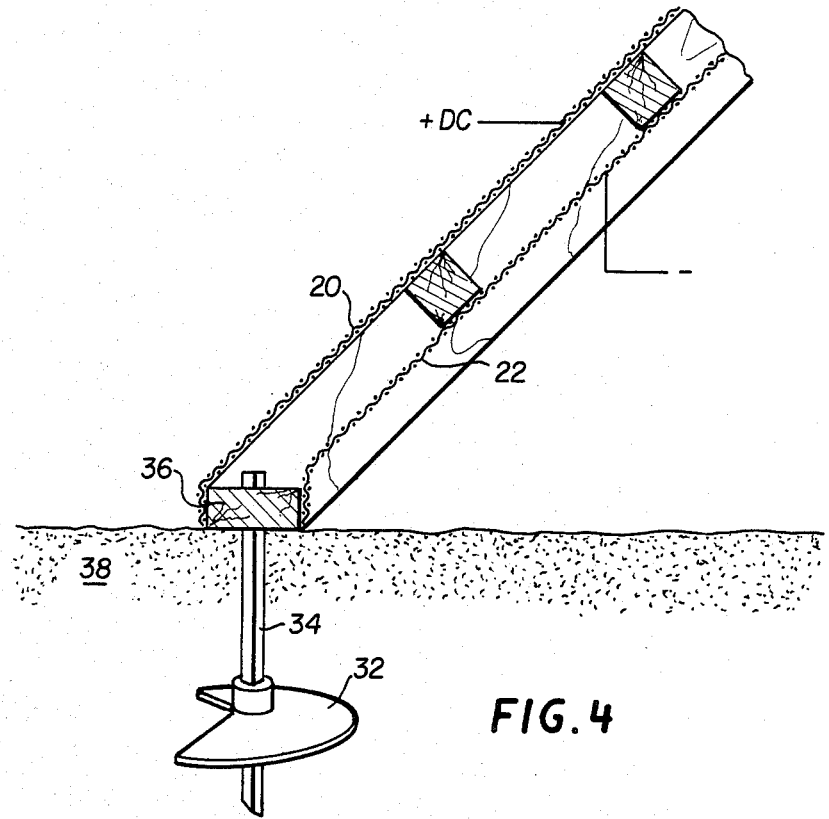
FIG. 4 shows a portion of the apparatus of FIG. 3 and further includes an anchor for anchoring the apparatus of FIG. 3 to a sea bed.
Figure 5:
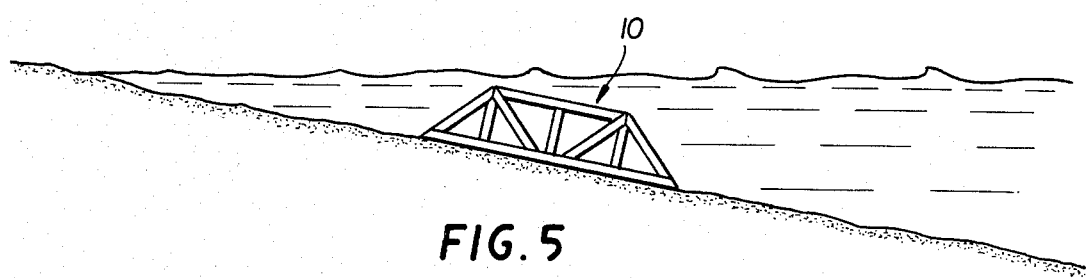
FIG. 5 is a sectional view of an ocean bottom, an ocean, and a breakwater frame used in practicing this invention illustrating a desirable location for practicing the method of this invention.

The first step in practicing this invention on an ocean floor as is depicted in FIG. 5 is to construct a frame structure 10 as is shown in detail in FIGS. 1-5. The frame 10 has a skeletal structure composed primarily of wooden 2"×6", 2"×2" and 2"×4" beams coated with a chemical preservative. The beams are joined together by common steel nails, with exposed nail heads being epoxied over so as to retard corrosion in the marine environment, to form five frame walls as follows: two inclined walls 12A and B, two end walls 14A and B and a top frame wall 16. Each of the frame members, such as a member 18 depicted in FIG. 3 has a 2 inch depth, that is, the thickness of the walls formed by these members is 2 inches. This is true for each of the inclined walls 12A and B, the end walls 14A and B and the top horizontal wall 16. Thus, each wall forms two surfaces separated by approximately 2 inches, or 5 centimeters.

This skeletal structure comprises a single unit which can, for example, be constructed in a factory, on site or partially in a factory and partially on site.

An electrically-conductive mesh-plate anode electrode 20 is attached on a top surface formed by the frame 10 and a second expanded metal plate cathode electrode 22 is attached on an inside surface formed by the frame 82, the inside and outside surfaces of the frame, of course, being separated by two inches and being parallel to one another thereby causing the anode and cathode plate electrodes to be separated by two inches and to be parallel to one another. It will be understood that each of the anode and cathode plate electrodes 20 and 22 can be formed of separate panels, one each for the inclined walls 12A and B, another each for the end walls 14A and B and a fifth for the top horizontal wall 16; however, each of these separate panels are electrically connected to adjacent panels at edges 24. The anode and cathode plate electrodes 20 and 22 are, however, not electrically connected with one another and are, in fact, insulated from one another by the electrically insulative frame 10. Steel staples of an appropriate size and strength are utilized for attaching the electrodes 20 and 22 to the wooden-frame members.

Figure 6:
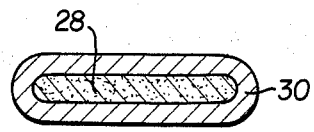
FIG. 6 is a cross-section of an electrode using this invention as taken on line 6—6 in FIG. 8.
Figure 8:
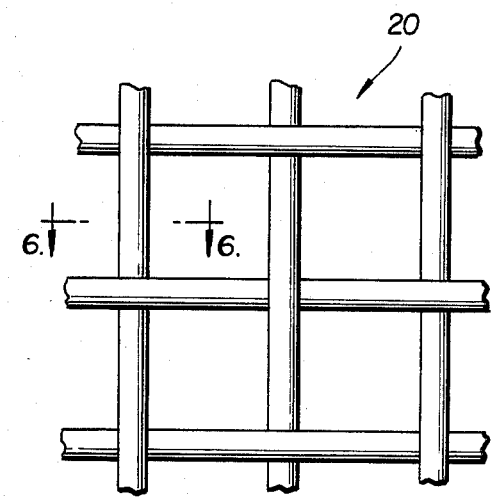
Figure 7:
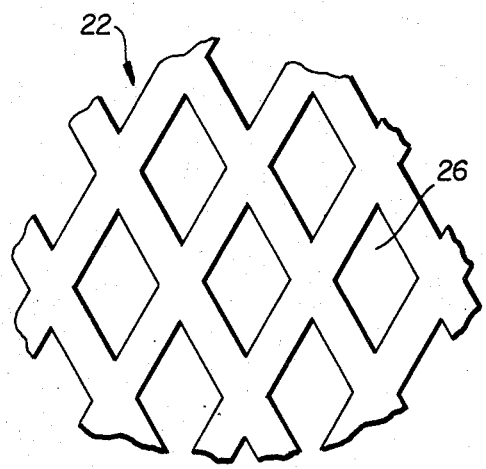
FIG. 7 is a small portion of an electrode serving as a cathode in the practice of the method of the invention; and, FIG. 8 is a small portion of an electrode serving as an anode in the practice of the method of the invention.

It is of relatively little importance as to whether the inside electrode 22 or the outside electrode 20 is used as an anode or a cathode, however, it is a good idea to arbitrarily choose one or the other to be the anode prior to construction because it is helpful to use different materials for constructing the anode and the cathode. In this respect, the cathode electrode 22 is constructed of expanded pure aluminum plate (FIG. 7), that is, an aluminum metal plate which has been perforated with cuts and then stretched outwardly to expand its size. One such aluminum plate is sold by Reynolds Metals under the trade designation 3003. This plate is actually an alloy comprising mainly aluminum but also including 0.6% silicon, 0.7% iron, 0.15% copper, 1.25% manganese and 0.12% zinc. Such plates have grid openings therein of between $\frac{1}{4}''$ and $1''$. The anode electrode 20, on the other hand, is constructed of meshed strips of graphite 28 sheathed in lead 30 (FIGS. 6 and 8), that is, the graphite 28 forms the interior of this material but the graphite is totally covered with lead. These anode strips are in electrical contact with one another where they cross to form the anode plate electrode 20. The purpose of making the anode and cathode electrodes 20 and 22 of these materials will become clear with an explanation of the function of the invention. FIG. 7 depicts a plan view of the cathode electrode expanded plate 22 having openings 26 therein. FIG. 8 is an enlargement of the anode mesh strips while FIG. 6 is a cross-section of a portion of FIG. 8 wherein one can see the inner carbon material 28 with its outer sheath of lead 30.

This structure, when submerged in an ocean environment, is attached to the sea bottom by a power installed screw anchor 32, or other appropriate device, as is depicted in FIG. 4. The screw anchor 32 is attached to a rectangular shaft 34 and can be rotated therewith from above a frame member 36. In this regard, the top of the shaft 34 is driven by a bolt head, crank, or other mechanism, which allows one to rotate the shaft 34 to thereby screw the spiral or screw anchor 32 into the sand 38. Similar anchors are positioned appropriately about the frame 10 to hold the frame on the ocean bottom, not allowing it to float to the surface.

Figure 3:
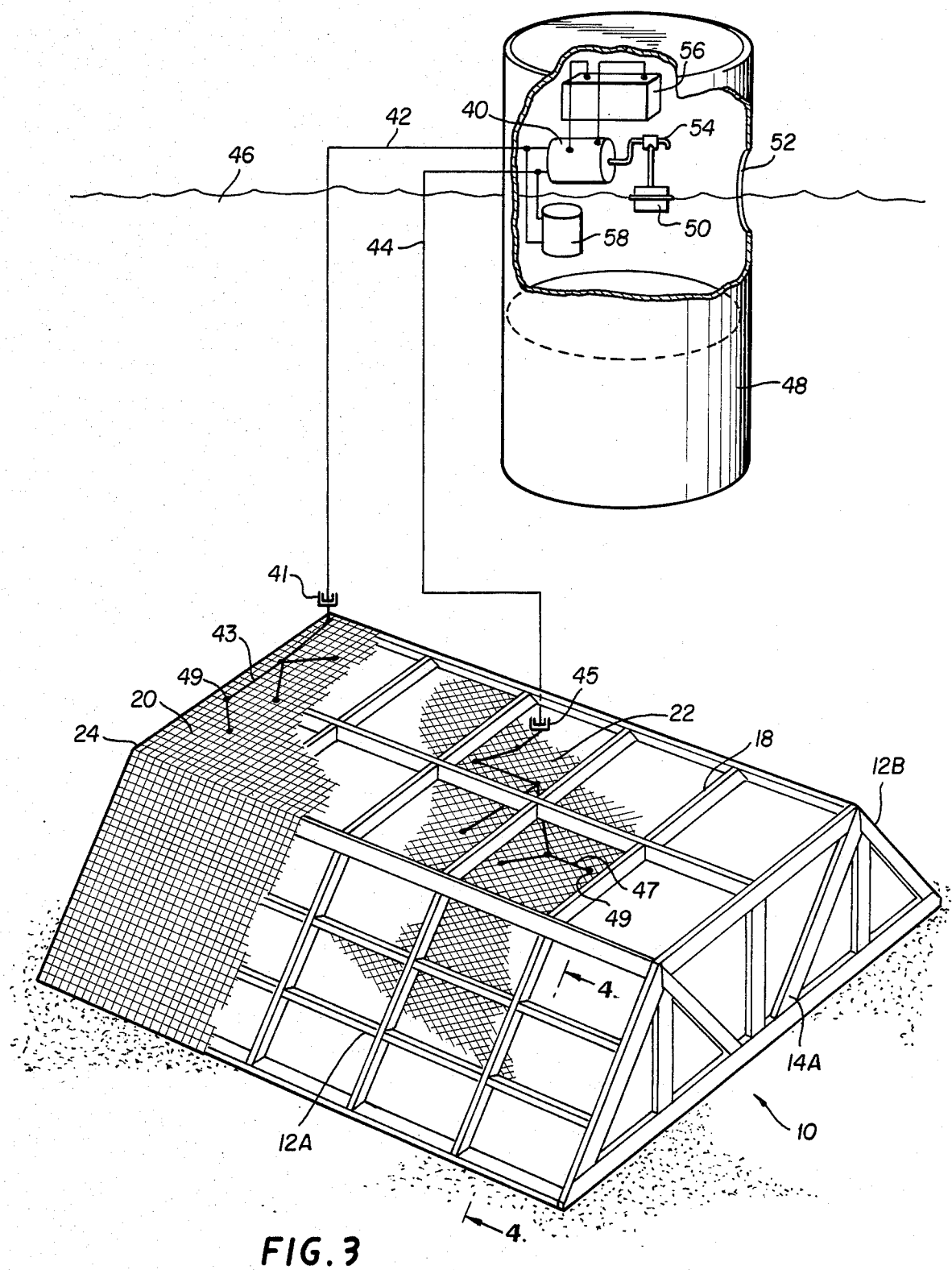
FIG. 3 is a perspective, partially cut-away, partially electrical schematic, view of the frame of FIG. 1, electrodes, a buoy, and an electrical circuit, used to practice the method of this invention.

Looking next at the electrical system employed with this invention, with reference to FIG. 3, a positive terminal of a d.c. generator 40 (or a positive terminal of a rectifier for an alternator) is physically and electrically attached by means of an 8 AWG multistrand copper or aluminum wire 42, a coupler 41 and a multistrand network 43 (only a few being shown) to the anode electrode plate 20. The negative terminal of the generator 40 is also physically and electrically attached by means of an 8 AWG multistrand copper or aluminum wire 44, a coupler 45, and a multistrand network 47 to the cathode electrode plate 22. The generator 40 is fully insulated from sea water 46 as are its connections with the wires 42 and 44 and, the wires 42 and 44 and the wire networks 43 and 47 are also insulated from the sea water 46. The exposed ends of the wire networks 43 and 47, which are attached to the electrode plates 20 and 22 are sealed by a silicone epoxy substance to protect these connections from errosion. With regard to the networks 43 and 47, their purpose is to evenly distribute electrical potential across the anode and cathode plates. These wire networks provide electrical attachments 49 to the anode and cathode plates which are spaced 6 inches from the nearest other attachments. The wires of the networks are fully insulated and their insulations are attached to the anode and cathode plates by a marine epoxy resin. Thus, the networks 43 and 47 and their respective couplers 41 and 45 are integral with the anode and cathode plates. Where the plates are formed of separate panels network wires and couples (not shown) are provided for interconnecting adjacent panels.

The generator 40 is supported above the surface of the sea water 46 by a floating buoy 48 and is driven by geophysical energy, such as wave energy, wind energy and the like. In the depicted embodiment, the generator 40 is driven by a float 50 which rises and falls with small waves passing through holes 52 in the buoy 58 to thereby rotate a crank 54 which in turn drives an impeller shaft of the generator 40. It will be appreciated by those skilled in the art that it would be equally possible to have a windmill on the buoy 48 for driving the impeller shaft of the generator 40. Further, it would be possible to utilize a solar energy panel to produce the electrical energy required for this invention.

Also connected to the positive and negative terminals of the generator 40 is a battery 56 which is charged by the generator 40 during periods of active small-wave motion and which is discharged into the system during periods of limited small wave motion. Yet further attached to the positive and negative terminals of the generator 40 is a voltage regulator 58 which limits the voltage produced by the generator 40, thereby protecting the system and the battery 56.

Explaining briefly the principles involved in the operation of this invention, when a source of direct electrical potential is connected across electrodes inserted into an aqueous solution of an electrolyte, the negative electrode (cathode) is teeming with an excess of electrons, while the positive electrode (anode) has lost electrons and seeks to make up its deficiency. The positive and negative radicals of the electrolyte (seawater) do their best to assist in making a connection between the anode and cathode. The positive radicals in seawater are hydrogen atoms, each of which has lost an electron and has thereby become a hydrogen ion H. The negative radicals are chlorine atoms, each of which has acquired an electron and has thereby become a chlorine ion Cl. The hydrogen ions are attracted to the cathode in the expectation of recovering there the electrons which they have lost, while the chloride ions migrate to the anode with the purpose of delivering their extra electrons at the spot where they are urgently needed. Two orderly processions of ions, moving in opposite directions, proceed therefore through the solution towards the electrodes.

When a hydrogen ion reaches and touches the negative electrode (cathode), it gains an electron, and the result is an ordinary atom of hydrogen. The atoms of hydrogen unite to form molecules ($H_2$) and these form bubbles of the gas. Simultaneously the chloride ions lose electrons at the positive electrode and the atoms of free chlorine unite to give molecules ($Cl_2$). The particles moving toward the cathode (in directions of the electric current) have sometimes been called cations (having positive charge) and those having a negative charge and moving against the electric current toward the anode were referred to as anions.

In any event, the excess of hydrogen at the cathode radically changes the pH in the area of the cathode thereby decreasing the tendency of many metals to dissolve in seawater. In this respect, seawater contains an average of 35,000 parts per million of dissolved solids. In a cubic mile of seawater, weighing 4.7 billion tons, there are therefore about 165 million tons of dissolved matter, mostly chlorine and sodium. The change in the pH level at the cathode causes mainly chlorine, sodium, magnesium, sulfer, calcium and potassium to precipitate out of the water onto the cathode. Also, if a cation is an inactive metal such as Cu, Ag, Au, the cation will accept electrons at the cathode and be deposited on the cathode as a free metal. Thus, minerals will be accreted onto the cathode from the seawater.

The creation of hydrogen and the accretion rate at the cathode side is dependent upon the amount of d.c. current (amperage) employed. The amount of current is directly dependent upon the amount of electromotive force (emf) applied which is expressed in terms of volts.

The voltage needed for uniform accretion, therefore, will vary dependent upon the resistance encountered in the surface areas of the electrodes and the resistance inherent in the electrolyte (sea water). These factors are, in turn, dependent upon ion concentration in the seawater, the temperature of the seawater, and the distance between the anode and cathode.

In the operation of this particular invention, small-wave energy of the sea water 46 drives the float 50 up and down thereby turning the crank 54 and driving the generator 40 to charge the battery 56 and produce respectively uniform positive and negative charges on the anode electrode plate 20 and the cathode electrode plate 22 of around 3 volts. This voltage is maintained across these plate electrodes by the battery 56 during periods when the generator 40 is not putting out much energy. Thus, an electrical potential across the plate electrodes 20 and 22 of something less than 12 volts is established, and the system should be designed to provide about a 3 V±2 V potential across these plates as will be further explained below. The sea water 46 contains ions of minerals that are in solution. The negative ions are attracted to the anode, and the positive ions are attracted to the cathode. Many of the positive ions, are hydrogen ions which, when they give up the electron, are liberated as hydrogen into the sea water. In addition, electrolysis takes place which also liberates hydrogen at the cathode. This liberation of hydrogen into the electrolyte (sea water) thus alters the pH of the sea water, such that it becomes increasingly alkaline. Minerals thereby are forced out of equilibrium with the solution due to the alteration of pH brought about by the generation of hydrogen in the form of gas. A precipitation of minerals therefore accrues on the cathode. This precipitation of minerals is dependent upon the alteration of pH, which in turn is dependent upon the generation of hydrogen ions. The quantity of hydrogen ions generated is directly dependent upon the flow of electrons between the anode and the cathode. The flow of electrons is measured by the current flowing between the anode electrode 20 and the cathode electrode 22.

Bubble overvoltage is the point at which gas bubble formation commences. The determination of overvoltage requires careful observation of the electrode to find the point at which bubble evolution commences as the applied EMF is gradually increased, or that at which visible evolution ceases on decreasing the EMF. Experimentation has shown this to take place at about 0.0069 ma per square centimeter of cathode area ($ma/cm^2$).

The current flow in the system is dependent upon the amount of resistance encountered in the circuit. Here sea water acts as the resistance of the circuit. An increase in distance between the anode and cathode 20 and 22 increases the resistance. The resistance, therefore, is dependent upon the distance in which the electrons must travel between the anode and the cathode. The greater the distance between these two members, the greater the resistance and the current flow is thereby decreased according to Ohm's law, $I=E/R$. Of course the voltage can then be increased to increase the current back up to where it was for the smaller gap between electrodes, however, one runs into practical problems at higher voltages involving production of these higher voltages and maintaining electrical parts insulated from one another.

It has been determined that a workable voltage for creating the desired amount of current can be used when the cathode and anode are separated by about 5 cm (approximately 2 inches). When these electrodes are separated by about 8", a higher potential is therefore required to achieve a satisfactory current, for precipitating minerals onto the cathode 22 at an appropriate rate. Such a higher voltage is not as good.

Similarly, it has been found that the optimum current density for producing desirable, hard, precipitate is around 0.0175 $ma/cm^2$ of electrode, not to exceed 0.02 $ma/cm^2$ of electrode. When the current exceeds the higher level, especially when it gets to around 0.1 $ma/cm^2$, the precipitate is mushy and does not form a satisfactory structure for producing a breakwater. In this respect, when the current flowing between the anode and cathode electrodes is too high, too much hydrogen is produced at the cathode such that bubbles at the cathode prevent proper bonding between precipitated materials.

The electrical distribution networks 43 and 47 assure that the voltage differential across the plate electrodes 20 and 22 is substantially uniform throughout the plates. Without the distribution networks most of the current would tend to flow between the plates 20 and 22 near connections of the wires 42 and 44 to the plates, which would provide uneven precipitation.

The purpose in constructing the anode of carbon material or aluminum surrounded by lead is to make this element both inexpensive and durable. In this respect, the carbon is relatively inexpensive, while the atoms of the lead sheathing are so dense and tightly bonded that this material does not deposit out with the flow of an electrical current and therefore corrosion is almost eliminated. Although it is more expensive to make a lead covered graphite anode than a single metal anode, in the long run it is cheaper because it does not corrode so quickly.

It will be understood by those skilled in the art that a breakwater can be made according to the principles disclosed herein but of multi-layers of precipitated material created by multi-layers of anode and cathode electrodes held in appropriate frames similar to the single layer embodiment described in detail herein.

Ideally, the gap between layers should be around 5 cm. Similarly, the potential applied across the electrode plates should be somewhere between 1 and 10 V, ideally around 3 V. The voltage which is produced by the generator 40 and the voltage regulator 58 would depend upon losses in the wires 42 and 44 in order to get the proper voltages across the anode and cathode.

It will be understood by those skilled in the art that the method described herein for building a breakwater is about ⅓ of the current price and is performed in a somewhat natural manner. In this respect, the electrodes 20 and 22 and the frame 10 will eventually corrode or rot away, but before they do, they will produce a solidified wall of accretion two inches thick which will stay solidly in position for a long, long time.

It will also be appreciated by those skilled in the art that this device can be built without the use of tremendously large machinery being put in position by boats, ships and barges and that the materials used can actually be assembled in a factory and then easily installed at location. Further, the practice of the method of this invention can be carried out in steps, that is, small portions of breakwaters can be built separately but ganged together to form one large breakwater. The material itself for forming the breakwater comes from the ocean and does not need to be transported to site. Similarly, the energy for producing the main walls of the breakwater is provided naturally by the wind and/or tidal and wave currents.

While the invention has been particularly shown and described with reference to a preferred embodiment, it will be understood by those skilled in the art that various changes in form and detail may be made therein without departing from the spirit and scope of the invention. For example, a polymer frame could be used rather than a wooden frame. Also, a more rigid aluminum cathode could be used without a frame on which the anode is mounted with insulators. A metal frame could also be used if the electrodes are properly insulated from it. Similarly, other shaped frames could be used. Passive solar systems could be used to generate the electrical energy necessary for practicing this invention. The anode 20 could be constructed of aluminum covered with lead rather than graphite covered with lead. Graphite is cheaper, but aluminum serves as a better conductor. If the anode were constructed of aluminum, it could be expanded aluminum plate such as the cathode or it could also be strips, the same as for the graphite strips already described. In either case it would still be covered with lead.

The embodiments of the invention in which an exclusive property or privilege is claim are defined as follows:

1. A method of making a synthetic breakwater in sea water comprising the steps of:
    arranging a frame having the approximate shape of the breakwater to be made in sea water so that the frame is resting on a floor in the sea water and the frame is in said sea water, said frame comprising electrically insulative support members dfining two relatively flat, approximately parallel surfaces being separated by a gap of from 3 cm to 20 cm, said frame further comprising at least two flat electrically conductive electrodes approximately coextensive in lateral-dimension size and each being approximately of a lateral dimension size that a completed breakwater is to be, each flat electrode being mounted on one of said frame surfaces opposite the other so that said flat electrodes are spaced a fixed distance of between 3 cm and 20 cm apart;
    applying an electrical potential across said electrodes to cause a current density flowing between said electrodes of not greater than 0.1 ma/cm$^2$, with one of said electrodes becoming an anode and the other a cathode, said electrical potential being applied to each of said electrodes at numerous locations on said electrode, said locations being relatively uniformly positioned throughout the length and breadth of each of said electrodes, whereby said electrical potential is evenly distributed across said anode and cathode electrodes.

2. A method of making a synthetic breakwater as disclosed in claim 1 wherein the anode of said electrodes is formed of meshed metallic strips while the cathode is constructed of an expanded metal.

3. A method of making a synthetic breakwater as in claim 1 wherein the anode is constructed of an inner electrical conductive material and an outer conductive electrical material, the outer material being lead.

4. A method of making a synthetic breakwater as in claim 3 wherein said inner conductive material is carbon.

5. A method of making a synthetic breakwater as in claim 3 wherein the cathode is an extruded aluminum plate.

6. A method of making a synthetic breakwater as in claim 1 wherein said numerous locations on each of said electrodes at which said potential is applied are separated from one another by a distance of approximately 6 inches.

7. A method of making a synthetic breakwater as in claim 1 wherein said spacing is approximately 5 cm.

8. A method of making a synthetic breakwater in water as in claim 7 wherein said applied voltage applied across said plates is between 2 and 4 V.

9. A method of making a synthetic breakwater in water as in claim 1 wherein a sufficient amount of electrical potential is applied across said electrode plates to cause a current density between said plates of approximately 0.0175 ma/cm$^2$.

10. A method as in claim 1 wherein there are multilayers of anode and cathode electrodes, with each layer being parallel to the adjacent layers and the layers being separated by insulative support members.

11. Apparatus for making a synthetic breakwater in seawater comprising the steps of:
    a frame having the approximate shape of the breakwater to be made in seawater, said frame having a resting means for supporting said frame on a floor in the seawater, said frame comprising electrically insulative support members defining two relatively flat, approximately parallel surfaces being separated by a gap of from 3 cm to 20 cm, said frame further comprising at least two flat electrically conductive electrodes approximately co-extensive in lateral-dimension size and each being approximately of a lateral dimension size that a completed breakwater is to be, each flat electrode being mounted on one of said frame surfaces opposite the other so that said flat electrodes are spaced a fixed distance of between 3 cm and 20 cm apart;
    an electrical potential source electrically coupled to said two flat electrically conductive electrodes at numerous locations on said electrode, said locations being relatively uniformly positioned throughout the length and breadth of each of said electrodes for applying an electrical potential substantially evenly across each of said electrodes to cause a current density flowing between said electrodes of not greater than 0.1 ma/cm$^2$, with one of said electrodes becoming an anode and the other a cathode.

12. An apparatus as in claim 11 wherein the anode of said electrodes is constructed of an inner electrical conductive material and an outer electrical conductive material, the outer material being lead.

13. An apparatus as in claim 11 wherein said spacing is approximately 5 cm.

14. An apparatus as in claim 11 wherein said electrical source includes a means for impressing an electrical potential across said electric plates to cause a current density between said plates of approximately 0.0175 ma/cm$^2$.

15. An apparatus as in claim 11 wherein there are multilayers of anode and cathode electrodes, with each layer being parallel to the adjacent layers and the layers being separated by insulative support members.

* * * * *